Sept. 10, 1929.  A. CHAMPION  1,727,632
ILLUMINATED INSTRUMENT PANEL
Filed Feb. 23, 1928
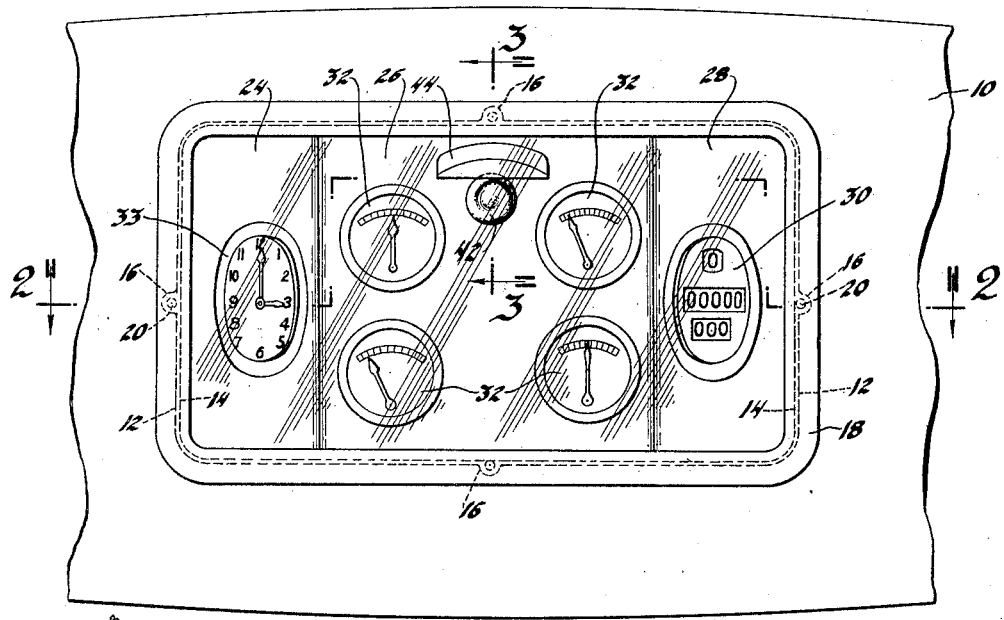
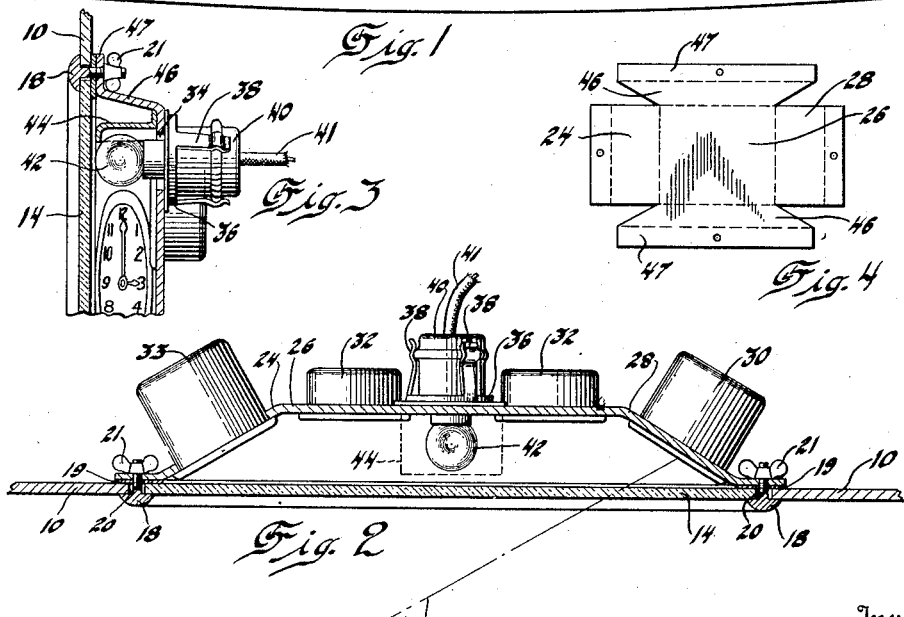
Inventor
Albert Champion
By Blackwood, Spencer & Hich
Attorneys Patented Sept. 10, 1929.

1,727,632

UNITED STATES PATENT OFFICE.

ALBERT CHAMPION, DECEASED, LATE OF FLINT, MICHIGAN, BY BASIL W. DE-GUICHARD, OF FLINT, MICHIGAN, AND DETROIT TRUST COMPANY, OF DETROIT, MICHIGAN, EXECUTORS, ASSIGNORS TO A C SPARK PLUG COMPANY, OF FLINT, MICHIGAN, A CORPORATION OF MICHIGAN.

ILLUMINATED INSTRUMENT PANEL.

Application filed February 23, 1928. Serial No. 256,434.

This invention relates to an instrument panel and has particularly to do with a plural-plane, and horizontally concave panel for supporting the instruments usually mounted on the dashboard of an automotive vehicle.

It is an object of the invention to provide an instrument panel which is an improvement over the art from the standpoint of the visibility of the separate instruments from the driver's seat. It is a further object of the invention to provide an improved lighting arrangement for the instruments by locating the instruments and the light bulb in such a manner that, side portions of said panel being rearwardly divergent, the light from a central source disposed near the plane of said part or that of a glass in an aperture in said part, will strike the faces of the instruments more directly and will illuminate them more clearly than has hitherto been the case.

It is a further object of the invention to accomplish these results by means of illumination from a source of light fixed in front of the face of the dashboard and arranged so that the rays therefrom will not directly strike the eye of the operator. One of the particular advantages of this construction is that the light is more efficiently used than has hitherto been the case, since the light strikes the faces of the instruments more directly than is usual with an internally illuminated panel and since all the light which does not strike the face of the panel is directed downward to illuminate the floor of the car and adjacent parts.

Other objects and advantages of the invention will appear in the course of the following description, taken in connection with the accompanying drawing and appended claims.

In the drawing:

Figure 1 is a front view of my improved instrument panel.

Figure 2 is a section taken on the line 2—2 of Figure 1.

Figure 3 is a section on the line 3—3 of Figure 1.

Figure 4 is a view on a small scale, showing the shape of the metallic sheet from which the panel is stamped.

Referring to that embodiment of the present invention which is shown in the drawing, a portion of the dashboard 10 is shown as provided with an aperture 12 within which fits the glass plate 14. For purposes of illustration, there is shown in Figure 1 a slight clearance between the aperture 12 and glass 14, while in the practical embodiment of my invention this clearance should be reduced to a minimum. On the four sides of the aperture 12 are formed slots 16.

On the rear side of the dashboard, using the word "rear" to denote the side toward the rear of the car, is the ornamental bezel 18 which is of the same shape as the aperture 12 and covers the line of abutment between the glass plate 14 and dashboard 10. The bezel 18 is formed integrally with threaded bosses or screws 20 which extend through the respective slots 16 in the dashboard and through holes in the instrument panel for holding the panel, glass plate and bezel firmly in position on the dashboard. The bosses 20 are provided with wing nuts 21. A gasket 19 holds the panel slightly spaced from the glass cover 14 and dashboard 10.

The panel is shown as formed from a single metal stamping and comprises a central zone or main portion 26 and side zones or wing portions 24 and 28, the planes of the side zones striking the plane of the central zone at equal angles and in substantially parallel and vertical lines. While this angle is shown as being about one hundred fifty degrees and said lines are shown as straight lines, it is within the concept of the present invention to join these zones at any desired obtuse re-entrant angle or angles, the resultant concavity being favorable to illumination of the side zones or wing portions about equally with the central zone or portion.

The panel is provided with openings for receiving the various instruments and exposing the dials thereof. The exact arrangement of these openings, and consequently of the instruments, may be varied within wide limits, depending upon the artistic effect it is desired to produce and upon the number of instruments it may be desirable to mount on the panel. It may ordinarily be preferable to mount the speedometer 30 in the right hand zone 28 and the clock 33 in the left hand zone 24; and four instruments 32 are shown as mounted in the respective corners of the central zone 26. These may be an ammeter, oil pressure gauge, gasoline gauge, a temperature indicator for the engine cooling system or crankcase, or any other instrument of similar character which it may be considered desirable to mount on the dashboard. Each instrument case fits into its respective aperture from the rear side of the panel and is held fixed in position on the panel by any usual or desired means (not shown).

In the upper central portion of the central zone 26 there may be provided an aperture 34 and on the front side of the panel and surrounding the aperture 34 is a light supporting bracket 36. Bracket 36 is welded to the front side of the panel and is provided with three spring fingers 38 adapted to receive and to hold the socket 40 connected with conductor wire 41 and carrying a removable light bulb 42.

On the face or rear side of the central zone 26 is the hood 44, which comprises an arc-shaped sheet of metal welded or otherwise fixed to the panel. The hood may be provided on its under side with a bright finish for reflecting the light generally downward to the faces of the instruments and through the glass plate 14 toward the floor and adjacent parts of the car.

The panel is formed with an upper flange 46 extending from the central zone 26 toward the dashboard and upward, as at 47, where it covers the line of abutment between the glass plate 14 and dashboard 10 and receives through an opening the threaded boss 20. The lower side of the central zone is formed with a rearward extending flange 46 which is the exact counterpart of the upper flange 46. The flanges 46 are integral with the central zone 26 and fit evenly with the upper and lower edges respectively of zones 24 and 28 of the panel and thus form a substantially dust-proof casing. The form of the casing will be obvious from an inspection of Figure 4 which illustrates the shape of the metallic sheet before it is stamped to assume the form illustrated in Figures 1, 2 and 3.

The advantages of the construction described are illustrated diagrammatically in Figure 2. Point A illustrates diagrammatically the normal or usual position of the operator of a left hand drive car, while dotted line B indicates the operator's line of vision to speedometer 30. This line B strikes the face of instrument 30 at an angle much nearer perpendicular than the same line would strike the face of a similarly located instrument arranged with its face in the same plane as the faces of the instruments on the central zone 26. While the arrangement illustrated correspondingly obscures the opposite instrument 33, this occasions no particular inconvenience as the operator seldom looks at the clock while he glances constantly at the speedometer.

The angular position of the side zones 24 and 28 also serves to permit the rays of light from the bulb 42 to strike the faces of the instruments 30 and 33 more directly than if the instrument faces were in a single plane, and hence provides better illumination. Locating the central zone 26 some distance in rear of the glass plate 14 makes possible the placing of the light bulb 42 in front of the panel but in rear of the glass cover where it will not be in the way of the operator. The hood or reflector 44 shades the bulb and reflects the light toward the floor of the car. This arrangement combines the advantages of direct and indirect lighting systems for instrument panels.

I claim:

1. In an instrument assembly, a supporting means and a panel supported thereon comprising a central portion and rearward diverging side wings, said zones having instruments mounted thereon suitably for display under direct central illumination.

2. In an instrument assembly, a dashboard provided with an aperture, an instrument panel on the forward side of said dashboard over said aperture and comprising a central portion and rearward diverging side portions forming re-entrant angles, and instruments supported in said portion suitably for display under direct central illumination.

3. In an instrument assembly, a dashboard provided with an aperture, an instrument panel on the forward side of said dashboard and comprising a central portion and rearward diverging side portions meeting said central portion in substantially straight lines, instruments supported in said portions, and a source of light on the rear side of said panel and so supported by said panel as directly to illuminate all of said portions suitably for display under direct central illumination.

4. In an instrument assembly, a dashboard provided with an aperture, an instrument panel over said aperture, said panel comprising a central portion spaced forward of the plane of the dashboard and side portions diverging rearward therefrom, instruments supported in said portions suitably for display under direct central illumination, a source of light on the rear side of the central portion and supported by said panel, and a hood fixed to the panel over said source of light for reflecting the light generally downward toward the instruments and toward the floor of the car.

5. In an instrument assembly, a dashboard provided with an aperture, a transparent cover plate over said aperture, a concave instrument supporting and displaying panel comprising portions which meet in a substantially vertical line, said panel being fixed on the forward side of the dashboard and spaced therefrom, a source of light between said panel and cover plate and supported on said panel, and a hood fixed to the panel over the source of light for reflecting the light generally downward toward the faces of the instruments and toward the floor of the car.

6. In an instrument assembly, a dashboard and a panel mounted thereon, said panel comprising rearwardly diverging side portions inwardly bounded by substantially vertical lines, and instruments supported and displayed on said portions.

7. In an instrument assembly: a part provided with an opening having a glass therein; and a plural-plane instrument-carrying panel mounted forwardly of said glass and suitably for direct illumination from a source near the plane of said glass,—said panel comprising a central portion and rearwardly divergent side portions whose planes intercept the plane of said central portion in substantially straight lines, the angles between said portions being re-entrant and obtuse and favorable both to the illumination thereof from said source and to visibility from a driver's normal position.

BASIL W. DEGUICHARD,
DETROIT TRUST COMPANY,
*Executors of Albert Champion, Deceased.*
By McPHERSON BROWNING,
*President.*